US009955397B2

(12) United States Patent
Liu et al.

(10) Patent No.: US 9,955,397 B2
(45) Date of Patent: Apr. 24, 2018

(54) CELL HANDOVER METHOD AND TERMINAL

(71) Applicant: HUAWEI DEVICE (DONGGUAN) CO., LTD., Dongguan (CN)

(72) Inventors: Xin Liu, Beijing (CN); Shui Liu, Beijing (CN); Zhenfeng Fan, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 15/110,558

(22) PCT Filed: Jan. 8, 2014

(86) PCT No.: PCT/CN2014/070293
§ 371 (c)(1),
(2) Date: Jul. 8, 2016

(87) PCT Pub. No.: WO2015/103740
PCT Pub. Date: Jul. 16, 2015

(65) Prior Publication Data
US 2016/0345228 A1    Nov. 24, 2016

(51) Int. Cl.
*H04W 4/00* (2009.01)
*H04W 36/20* (2009.01)
(Continued)

(52) U.S. Cl.
CPC .......... *H04W 36/20* (2013.01); *H04B 17/318* (2015.01); *H04L 5/0016* (2013.01);
(Continued)

(58) Field of Classification Search
CPC . H04W 36/20; H04W 36/08; H04W 36/0083; H04W 36/30; H04W 84/042; H04B 17/318; H04L 5/0016
See application file for complete search history.

(56) References Cited

U.S. PATENT DOCUMENTS

| 2009/0239533 A1* | 9/2009 | Somasundaram ... H04J 11/0093 455/434 |
| 2011/0188471 A1* | 8/2011 | Kim ...................... H04W 24/10 370/331 |
| 2013/0089045 A1* | 4/2013 | Jun ................... H04W 72/0453 370/329 |

FOREIGN PATENT DOCUMENTS

| CN | 1568085 A | 1/2005 |
| CN | 101594632 A | 12/2009 |
| CN | 101715220 A | 5/2010 |

OTHER PUBLICATIONS

Partial English Translation and Abstract of Chinese Patent Application No. CN101594632, Dec. 2, 2009, 6 pages.
(Continued)

*Primary Examiner* — Kiet Tang
(74) *Attorney, Agent, or Firm* — Conley Rose, P.C.

(57) ABSTRACT

A cell handover method and a terminal, where the method includes acquiring information about at least one candidate cell, performing priority sorting on the at least one candidate cell according to strength of interference to a received signal of a code division multiple access (CDMA) network of each candidate cell in the at least one candidate cell, sending a sorting result to a base station, receiving an indication message sent by the base station, where the indication message includes at least information about a target cell, performing a handover to the target cell according to the indication message, and hence interference to a received signal may be effectively prevented or reduced after a cell handover, communication quality and user experience are ensured, and additional network overheads and hardware design costs and complexity thereof are not increased.

11 Claims, 6 Drawing Sheets

(51) Int. Cl.
H04W 36/30 (2009.01)
H04W 36/00 (2009.01)
H04B 17/318 (2015.01)
H04L 5/00 (2006.01)
H04W 36/08 (2009.01)
H04W 84/04 (2009.01)

(52) U.S. Cl.
CPC ....... *H04W 36/0083* (2013.01); *H04W 36/08* (2013.01); *H04W 36/30* (2013.01); *H04W 84/042* (2013.01)

(56) References Cited

OTHER PUBLICATIONS

Foreign Communication From A Counterpart, PCT Application No. PCT/CN2014/070293, English Translation of International Search Report dated Sep. 30, 2014, 2 pages.
Foreign Communication From A Counterpart, PCT Application No. PCT/CN2014/070293, English Translation of Written Opinion dated Sep. 30, 2014, 8 pages.

* cited by examiner

CELL HANDOVER METHOD AND TERMINAL

CROSS-REFERENCE TO RELATED APPLICATION

This application is a U.S. National Stage of International Application No. PCT/CN2014/070293, filed on Jan. 8, 2014, which is hereby incorporated by reference in its entirety.

TECHNICAL FIELD

The present disclosure relates to the field of communications technologies, and in particular, to a cell handover method and a terminal.

BACKGROUND

Currently, when a code division multiple access 2000 (CDMA2000) (a third generation (3G) mobile communications standard) network transits to a long term evolution (LTE) network, a voice solution simultaneous voice and LTE (SVLTE) becomes a preference of operators. The SVLTE is a technical solution that can resolve a voice transmission problem in an LTE network, and the solution makes it unnecessary for an operator to make too many modifications to a current network, which shortens an evolution period and reduces costs. A terminal with two modes being CDMA and LTE of a dual radio frequency system is introduced to the SVLTE, and the terminal uses two sets of radio frequency systems to separately process a CDMA20001x voice service and an LTE data service such that data and voice services can run at the same time.

For an SVLTE terminal that supports a CDMA2000 network and an LTE network, two sets of radio frequency circuits work simultaneously. In addition to bringing stress from the perspectives of power consumption, heat dissipation, layout, costs, and the like, a mutual interference problem between two signals of the radio frequency circuits also severely affects radio frequency receive sensitivity, thereby causing problems such as a network disconnection and call drop, and affecting normal use of a user.

Technical solutions for improving a signal interference problem in the prior art and respective disadvantages mainly include:

1. For antenna layout, a physical distance between an LTE antenna and a CDMA antenna is increased to the greatest extent, to decrease coupling between the two antennas. Generally, antenna isolation with a high frequency of 10 decibel (dB) and a low frequency of 8 dB can only be achieved by optimizing an antenna and increasing a physical distance between antennas, and an effect of improving a mutual interference problem is limited.

2. Interference to a received signal of a CDMA network is reduced in a manner of backing off transmit power of an LTE network and a CDMA1x (a first phase of CDMA2000) network, and more than 20 dB is backed off when necessary. Because transmit power at a network end is controlled by a network power control mechanism, and in principle, additional power backoff cannot be performed autonomously. Otherwise, a probability of call drop and network disconnection can be increased and user experience can be affected.

SUMMARY

Embodiments of the present disclosure provide a cell handover method and a terminal, which can reduce or prevent signal interference generated between an LTE network and a CDMA network when a CDMA cell is handed over, and improve communication quality.

To resolve the foregoing technical problem, a first aspect of the present disclosure provides a cell handover method, including acquiring information about at least one candidate cell, performing priority sorting on the at least one candidate cell according to strength of interference to a received signal of a CDMA network of each candidate cell in the at least one candidate cell, sending a sorting result of the at least one candidate cell to a base station, receiving an indication message sent by the base station, where the indication message includes at least information about a target cell that is determined by the base station according to the sorting result, and performing a handover to the target cell according to the indication message.

Based on the first aspect, in a first feasible implementation manner of the first aspect, acquiring information about at least one candidate cell includes acquiring pilot signal strength and frequency information of each candidate cell in the at least one candidate cell, where the frequency information includes a transmit frequency of an LTE network and a transmit frequency of the CDMA network of the at least one candidate cell, and performing priority sorting on the at least one candidate cell according to strength of interference to a received signal of a CDMA network of each candidate cell in the at least one candidate cell includes determining whether the transmit frequency of the LTE network of each candidate cell in the at least one candidate cell is in a preset first transmit frequency band of the LTE network and whether the transmit frequency of the CDMA network of each candidate cell in the at least one candidate cell is in a preset second transmit frequency band of the CDMA network, where an intermodulation signal generated between a signal in the first transmit frequency band of the LTE network and a signal in the second transmit frequency band of the CDMA network interferes with the received signal of the CDMA network, and performing priority sorting on the at least one candidate cell according to a determining result and the pilot signal strength of each candidate cell in the at least one candidate cell.

Based on the first feasible implementation manner of the first aspect, in a second feasible implementation manner of the first aspect, performing priority sorting on the at least one candidate cell according to a determining result and the pilot signal strength of each candidate cell in the at least one candidate cell includes performing priority sorting on the at least one candidate cell according to the pilot signal strength of each candidate cell in the at least one candidate cell if none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band.

Based on the first feasible implementation manner of the first aspect, in a third feasible implementation manner of the first aspect, performing priority sorting on the at least one candidate cell according to a determining result and the pilot signal strength of each candidate cell in the at least one candidate cell includes, if a transmit frequency of an LTE network of a first candidate cell in the at least one candidate cell is not in the first transmit frequency band and a transmit frequency of a CDMA network of the first candidate cell in the at least one candidate cell is not in the second transmit frequency band of the CDMA network, and a transmit frequency of an LTE network of a second candidate cell in the at least one candidate cell is in the first transmit frequency band and a transmit frequency of a CDMA network of the second candidate cell in the at least one candidate cell is in the second transmit frequency band, a priority of the first candidate cell being higher than a priority of the second candidate cell, where the first candidate cell is any candidate cell in the at least one candidate cell, and the second candidate cell is any candidate cell in the at least one candidate cell except the first candidate cell.

Based on the first feasible implementation manner of the first aspect, in a fourth feasible implementation manner of the first aspect, performing priority sorting on the at least one candidate cell according to a determining result and the pilot signal strength of each candidate cell in the at least one candidate cell includes separately acquiring actual transmit power of the LTE networks of all the candidate cells, actual transmit power of the CDMA networks of all the candidate cells, and actual receive power of the CDMA networks of all the candidate cells if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band- and performing priority sorting on the at least one candidate cell according to a difference between the actual receive power of the CDMA network of each candidate cell and preset receive power of each candidate cell when the actual receive power of the CDMA network of each candidate cell in the at least one candidate cell is less than minimum receive power, where the preset receive power is minimum receive power, which is preset by a terminal and at which first signal interference can be resisted, of the CDMA network, and the first signal interference is signal interference generated when the terminal works at the actual transmit power of the LTE network and the actual transmit power of the CDMA network.

Based on the first aspect or the first feasible implementation manner of the first aspect or the second feasible implementation manner of the first aspect or the third feasible implementation manner of the first aspect or the fourth feasible implementation manner of the first aspect, in a fifth feasible implementation manner of the first aspect, the indication message carries frequency information of the target cell, and performing a handover to the target cell according to the indication message includes performing, according to the indication message, a handover to the target cell corresponding to the frequency information.

A second aspect of the present disclosure provides a terminal, including a candidate cell information acquiring module configured to acquire information about at least one candidate cell, a sorting module configured to perform priority sorting on the at least one candidate cell according to strength of interference to a received signal of a CDMA network of each candidate cell in the at least one candidate cell, a sending module configured to send a sorting result of the at least one candidate cell to a base station, a receiving module configured to receive an indication message sent by the base station, where the indication message includes at least information about a target cell that is determined by the base station according to the sorting result, and a handover module configured to perform a handover to the target cell according to the indication message.

Based on the second aspect, in a first feasible implementation manner of the second aspect, the candidate cell information acquiring module includes a candidate cell information acquiring unit configured to acquire pilot signal strength and frequency information of each candidate cell in the at least one candidate cell, where the frequency information includes a transmit frequency of an LTE network and a transmit frequency of the CDMA network of the at least one candidate cell, and the sorting module includes a determining unit configured to determine whether a transmit frequency of an LTE network of each candidate cell in the at least one candidate cell is in a preset first transmit frequency band of the LTE network and whether a transmit frequency of the CDMA network of each candidate cell in the at least one candidate cell is in a preset second transmit frequency band of the CDMA network, where an intermodulation signal generated between a signal in the first transmit frequency band of the LTE network and a signal in the second transmit frequency band of the CDMA network interferes with the received signal of the CDMA network, and a sorting unit configured to perform priority sorting on the at least one candidate cell according to a determining result and the pilot signal strength of each candidate cell in the at least one candidate cell.

Based on the first feasible implementation manner of the second aspect, in a second feasible implementation manner of the second aspect, the sorting unit includes a first sorting subunit, where if none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band, the first sorting subunit is configured to perform priority sorting on the at least one candidate cell according to the pilot signal strength of each candidate cell in the at least one candidate cell.

Based on the first feasible implementation manner of the second aspect, in a third feasible implementation manner of the second aspect, the sorting unit includes a second sorting subunit, where if a transmit frequency of an LTE network of a first candidate cell in the at least one candidate cell is not in the first transmit frequency band and a transmit frequency of a CDMA network of the first candidate cell in the at least one candidate cell is not in the second transmit frequency band of the CDMA network, and a transmit frequency of an LTE network of a second candidate cell in the at least one candidate cell is in the first transmit frequency band and a transmit frequency of a CDMA network of the second candidate cell in the at least one candidate cell is in the second transmit frequency band, the second sorting subunit determines that a priority of the first candidate cell is higher than a priority of the second candidate cell, where the first candidate cell is any candidate cell in the at least one candidate cell, and the second candidate cell is any candidate cell in the at least one candidate cell except the first candidate cell.

Based on the first feasible implementation manner of the second aspect, in a fourth feasible implementation manner of the second aspect, the sorting unit includes a power acquiring subunit and a third sorting subunit, where if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band, the power acquiring subunit is configured to separately acquire actual transmit power of the LTE networks of all the candidate cells, actual transmit power of the CDMA networks of all the candidate cells, and actual receive power of the CDMA networks of all the candidate cells, and the third sorting subunit performs priority sorting on the at least one candidate cell according to a difference between the actual receive power of the CDMA network of each candidate cell and preset receive power of each candidate cell when the actual receive power of the CDMA network of each candidate cell in the at least one candidate cell is less than minimum receive power, where the preset receive power is minimum receive power, which is preset by a terminal and at which first signal interference can be resisted, of the CDMA network, and the first signal interference is signal interference generated when the terminal works at the actual transmit power of the LTE network and the actual transmit power of the CDMA network.

Based on the second aspect or the first feasible implementation manner of the second aspect or the second feasible implementation manner of the second aspect or the third feasible implementation manner of the second aspect or the fourth feasible implementation manner of the second aspect, in a fifth feasible implementation manner of the second aspect, the indication message carries frequency information of the target cell, and the handover module includes a handover unit configured to perform, according to the indication message, a handover to the target cell corresponding to the frequency information.

A third aspect of the present disclosure provides a computer storage medium, where the computer storage medium stores a program, and the program performs steps according to any one of claims 1 to 6.

A fourth aspect of the present disclosure provides a terminal, including a processor, a memory, an input device, and an output device, where the processor performs the following steps: acquiring information about at least one candidate cell, performing priority sorting on the at least one candidate cell according to strength of interference to a received signal of a CDMA network of each candidate cell in the at least one candidate cell, sending a sorting result of the at least one candidate cell to a base station, receiving an indication message sent by the base station, where the indication message includes at least information about a target cell that is determined by the base station according to the sorting result, and performing a handover to the target cell according to the indication message.

Based on the fourth aspect, in a first feasible implementation manner of the fourth aspect, acquiring, by the processor, information about at least one candidate cell includes acquiring pilot signal strength and frequency information of each candidate cell in the at least one candidate cell, where the frequency information includes a transmit frequency of an LTE network and a transmit frequency of the CDMA network of the at least one candidate cell, and performing, by the processor, priority sorting on the at least one candidate cell according to strength of interference to a received signal of a CDMA network of each candidate cell in the at least one candidate cell includes determining whether the transmit frequency of the LTE network of each candidate cell in the at least one candidate cell is in a preset first transmit frequency band of the LTE network and whether the transmit frequency of the CDMA network of each candidate cell in the at least one candidate cell is in a preset second transmit frequency band of the CDMA network, where an intermodulation signal generated between a signal in the first transmit frequency band of the LTE network and a signal in the second transmit frequency band of the CDMA network interferes with the received signal of the CDMA network, and performing priority sorting on the at least one candidate cell according to a determining result and the pilot signal strength of each candidate cell in the at least one candidate cell.

Based on the first feasible implementation manner of the fourth aspect, in a second feasible implementation manner of the fourth aspect, performing, by the processor, priority sorting on the at least one candidate cell according to a determining result and the pilot signal strength of each candidate cell in the at least one candidate cell includes performing priority sorting on the at least one candidate cell according to the pilot signal strength of each candidate cell in the at least one candidate cell if none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band.

Based on the first feasible implementation manner of the fourth aspect, in a fourth feasible implementation manner of the fourth aspect, performing, by the processor, priority sorting on the at least one candidate cell according to a determining result and the pilot signal strength of each candidate cell in the at least one candidate cell includes separately acquiring actual transmit power of the LTE networks of all the candidate cells, actual transmit power of the CDMA networks of all the candidate cells, and actual receive power of the CDMA networks of all the candidate cells if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band, and performing priority sorting on the at least one candidate cell according to a difference between the actual receive power of the CDMA network of each candidate cell and preset receive power of each candidate cell when the actual receive power of the CDMA network of each candidate cell in the at least one candidate cell is less than minimum receive power, where the preset receive power is minimum receive power, which is preset by a terminal and at which first signal interference can be resisted, of the CDMA network, and the first signal interference is signal interference generated when the terminal works at the actual transmit power of the LTE network and the actual transmit power of the CDMA network.

Based on the fourth aspect or the first feasible implementation manner of the fourth aspect or the second feasible implementation manner of the fourth aspect or the third feasible implementation manner of the fourth aspect or the fourth feasible implementation manner of the fourth aspect, in a fifth feasible implementation manner of the fourth aspect, the indication message carries frequency information of the target cell, and performing, by the processor, a handover to the target cell according to the indication message includes performing, according to the indication message, a handover to the target cell corresponding to the frequency information.

As can be known from the above, when a cell handover is required, a degree of interference to a received signal of at least one candidate cell is predetermined in advance, priority sorting is performed according to the degree of interference, and after receiving a candidate cell after sorting, a base station can select an optimal candidate cell that totally generates no interference or generates relatively little interference as a target cell to be handed over to, to instruct a terminal to hand over to the target cell such that interference to a received signal can be effectively prevented or reduced after a cell handover, and communication quality and user experience are ensured.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An SVLTE terminal that supports two modes: an LTE network and a CDMA network needs to work in two sets of radio frequency circuit systems simultaneously. It is assumed that the LTE network works in a frequency band LTE Band4, and the CDMA network works in a frequency band CDMA1x BC0, and then, when power of two transmit signals is relatively large, due to limited antenna isolation and nonlinearity of a radio frequency front-end circuit, a second-order intermodulation product generated by the two transmit signals directly falls in a receive frequency band of CDMA1x, and therefore, receive sensitivity of CDMA1x is interfered with.

In the embodiments of the present disclosure, second-order intermodulation interference generated by two signals is used as an example. A transmit signal frequency band of a transmit signal in LTE Band4 is defined as that $f1=1710$ megahertz (MHz) to 1755 MHz, a frequency band of a transmit signal in CDMA1x BC0 is defined as that $f2=824$ MHz to 849 MHz, a frequency band of a received signal in CDMA1x BC0 is defined as that $f3=869$ MHz to 894 MHz, a carrier interval corresponding to the transmit signal in CDMA1x BC0 and the received signal in CDMA1x BC0 is 45 MHz, that is, $f3-f2=45$ MHz, and a frequency band of the second-order intermodulation product is $f4=f1-f2$.

When the frequency band f4 of the second-order intermodulation product is the same as the frequency band f3 of the received signal in CDMA1x BC0, a receiver is interfered with. According to this, a frequency band, in CDMA1x BC0, that is interfered may be calculated according to the intermodulation formula: $f4=f3=f1-f2$, and $f3-f2=45$ MHz.

As can be known from the calculation, when a transmit signal frequency in LTE Band4 is within a range of 1710 MHz to 1743 MHz, a transmit signal frequency in CDMA1x BC0 is within a range of 832.5 MHz to 849 MHz, and two carrier frequencies meet a formula ($f1=2*f2+45$), a generated second-order intermodulation product falls in a corresponding receive channel in CDMA1x BC0 in order to interfere with receive sensitivity in CDMA1x BC0.

Therefore, how to properly configure two carrier frequencies between the LTE network in which the SVLTE terminal is located and the CDMA network in which the SVLTE terminal is located is a key to resolving an interference problem.

Figure 1:
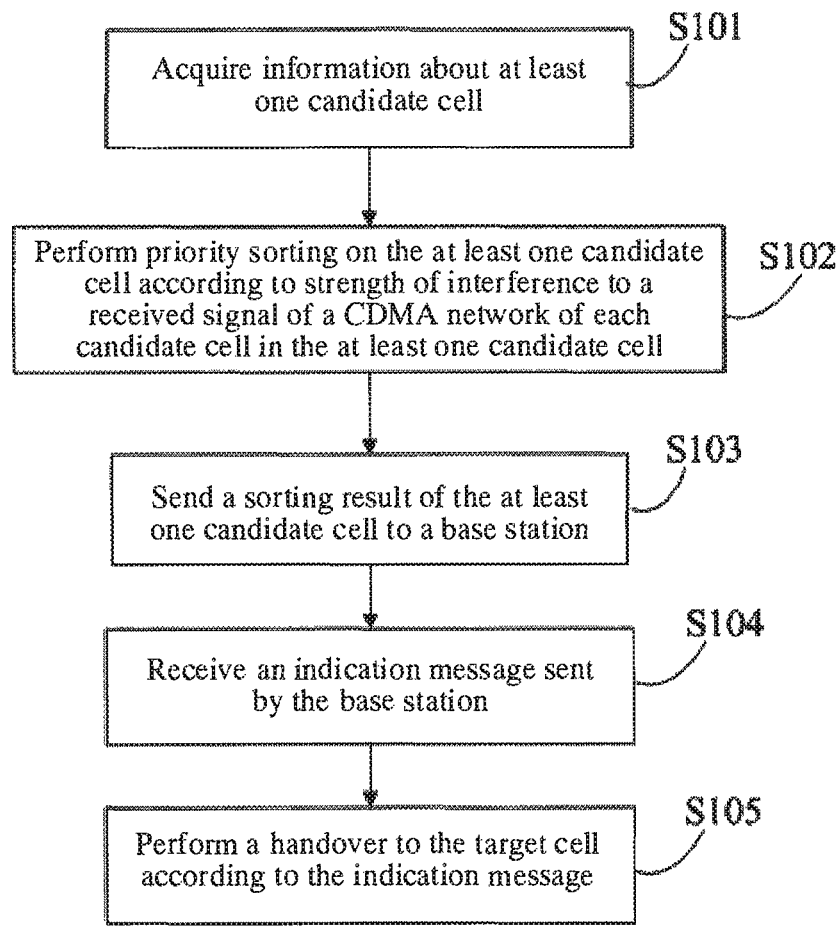
FIG. 1 is a schematic flowchart of a cell handover method according to an embodiment of the present disclosure.

Refer to FIG. 1, which is a schematic flowchart of a cell handover method according to an embodiment of the present disclosure. This embodiment is mainly described from a terminal side, and the method mainly includes the following steps.

Step S101: Acquire information about at least one candidate cell.

It should be noted that, a base station, that is, a public mobile communications base station, is a form of a radio station, and refers to a radio transceiver station that transmits information to a mobile terminal using a mobile communications switching center in a radio coverage area, and coverage of a radio signal of a base station is a cell. When a terminal is located at an edge of a CDMA1x cell or another neighboring cell of a cell in which a neighboring terminal resides can provide better communications link quality, a network system requires the terminal to perform a cell handover, that is, the terminal first disconnects a signal connection to an original base station and then establishes a connection to a base station of a new cell. If a frequency configuration of the new cell is different from a frequency of an original residing cell, it is an inter-frequency hard handover. Before the handover is performed, the terminal receives a trigger signal of the network system, where the trigger signal is used to instruct the terminal to acquire information about at least one candidate cell, and the information includes a frequency of each candidate cell in the at least one candidate cell, and the terminal searches for pilot signal strength of each candidate cell according to the frequency information.

Step S102: Perform priority sorting on the at least one candidate cell according to strength of interference to a received signal of a CDMA network of each candidate cell in the at least one candidate cell.

Because a frequency configuration of a candidate cell may be different from that of a current residing cell, after the cell handover, an intermodulation interference signal generated by two radio frequency transmit signals of an LTE network and the CDMA network may interfere with a received signal of a CDMA network of a cell after the handover. Therefore, before the handover, strength of interference to a received signal of each candidate cell should be predetermined such that the terminal preferentially selects a candidate cell that has no interference risk or a cell with a relatively small interference risk as a target cell to be handed over to.

It should be noted that, when the received signal of the CDMA network of each candidate cell is not interfered, that is, strength of interference is zero, sorting is performed according to the pilot signal strength of each candidate cell, and higher pilot signal strength indicates a higher priority. When an intermodulation product frequency generated by two radio frequency transmit signal of an LTE network and a CDMA network of a candidate cell is within an actual received signal frequency band range of the CDMA network, all received signals of the CDMA network of the candidate cell are interfered. In this case, priority sorting is performed according to a difference between actual receive power of the CDMA network and minimum receive power at which interference can be resisted and that is actually measured, and further, priority sorting may be performed by adjusting the pilot signal strength, for example, a pilot signal of a cell that is strongly interfered is reduced, and degrading processing is performed on a priority thereof.

Step S103: Send a sorting result of the at least one candidate cell to a base station.

Further, a message including the sorting result of the at least one candidate cell is sent to the base station such that the base station may select a target cell according to a priority sorting result, that is, a cell to which a terminal expects to hand over.

Step S104: Receive an indication message sent by the base station.

Where the indication message includes at least information about a target cell that is determined by the base station according to the sorting result.

The sorting result carries a priority sorting result of each candidate cell, which may further be a sorting result of the pilot signal strength. After selecting, according to the sorting result, a candidate cell with a highest priority as the target cell, the base station sends, to the terminal, an indication message for performing a handover, where the indication message carries frequency information corresponding to the target cell.

Step S105: Perform a handover to the target cell according to the indication message.

Furthermore, the terminal hands over, according to the indication message, to the target cell corresponding to the frequency information. The terminal may further send a handover completion message to the network system, to notify the network system that a hard handover process is successfully completed.

In this embodiment of the present disclosure, when a cell handover is required, a degree of interference to a received signal of at least one candidate cell is predetermined in advance, priority sorting is performed according to the degree of interference, and after receiving a candidate cell after sorting, a base station can select an optimal candidate cell that totally generates no interference or generates relatively little interference as a target cell to be handed over to, to instruct a terminal to hand over to the target cell such that interference to a received signal can be effectively prevented or reduced after a cell handover, communication quality and user experience are ensured, and additional network overheads and hardware design costs and complexity thereof are not increased.

Figure 2:
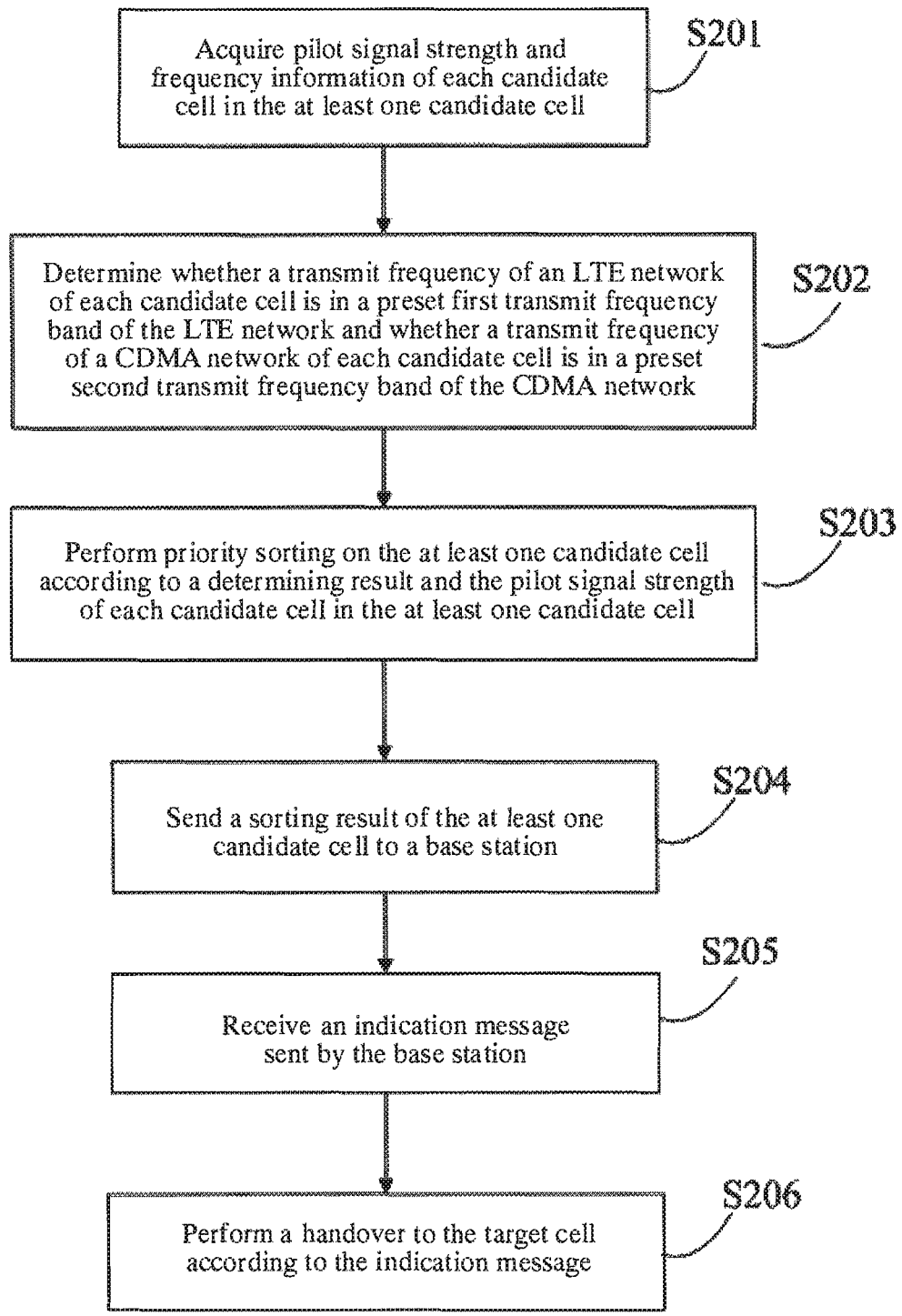
FIG. 2 is a schematic flowchart of another cell handover method according to an embodiment of the present disclosure.

Refer to FIG. 2, which is a schematic flowchart of a cell handover method according to an embodiment of the present disclosure. This embodiment is mainly described from a terminal side, and the method mainly includes the following steps.

Step S201: Acquire pilot signal strength and frequency information of each candidate cell in the at least one candidate cell.

Where the frequency information includes a transmit frequency of an LTE network and a transmit frequency of the CDMA network of the at least one candidate cell.

It should be noted that, when a terminal is located at an edge of a CDMA1x cell or another neighboring cell of a cell in which a neighboring terminal resides can provide better communications link quality, a network system requires the terminal to perform a cell handover, that is, the terminal first disconnects a signal connection to an original base station and then establishes a connection to a base station of a new cell. If a frequency configuration of the new cell is different from a frequency of an original residing cell, it is an inter-frequency hard handover. Before the handover is performed, the terminal receives a trigger signal of the network system, where the trigger signal is used to instruct the terminal to acquire information about at least one candidate cell, and the information includes frequency information of each candidate cell in the at least one candidate cell, and the terminal searches for and acquires pilot signal strength of each candidate cell according to the frequency information.

It should be noted that, a pilot signal is a direct sequence spread spectrum signal that is continuously transmit by a base station and that is not modulated, and the pilot signal enables a mobile phone to obtain a forward code division multiple access channel time limit, provide a related demodulation phase reference, and provide a signal strength comparison to each base station such that the terminal can determine a time to perform a handover.

Step S202: Determine whether a transmit frequency of an LTE network of each candidate cell is in a preset first transmit frequency band of the LTE network and whether a transmit frequency of a CDMA network of each candidate cell is in a preset second transmit frequency band of the CDMA network.

Where an intermodulation signal generated between a signal in the first transmit frequency band of the LTE network and a signal in the second transmit frequency band of the CDMA network interferes with the received signal of the CDMA network.

Furthermore, refer to Table 1, which is an anti-interference capability information table prestored by the terminal, where the table stores a first transmit frequency band $f_{LTE}$ of an LTE network and a second transmit frequency band $f_{1x}$ of a CDMA network that are supported by the terminal, and an intermodulation product of a signal in the first transmit frequency band $f_{LTE}$ of the LTE network and a signal in the second transmit frequency band $f_{1x}$ of the CDMA network interferes with the received signal of the CDMA network. The first transmit frequency band $f_{LTE}$ of the LTE network and the second transmit frequency band $f_{1x}$ of the CDMA network are calculated according to a frequency band capability supported by the terminal and the foregoing intermodulation formula, and when a configuration frequency (that is, a transmit signal frequency) of a candidate cell is within a range of $f_{LTE}$ and $f_{1x}$, a received signal of a CDMA network thereof is interfered with. By searching the anti-interference capability information table, it may be obtained whether the transmit frequency of the LTE network of each candidate cell is in the preset first transmit frequency band $f_{LTE}$ of the LTE network and whether the transmit frequency of the CDMA network of each candidate cell is in the preset second transmit frequency band $f_{1x}$ of the CDMA network.

Further, the anti-interference capability information table further stores a first transmit power set of a signal in the first transmit frequency band $f_{LTE}$ of the LTE network, a second transmit power set in the second transmit frequency band $f_{1x}$ of the CDMA network, and preset receive power, where the preset receive power is minimum receive power, which is preset by the terminal and at which first signal interference can be resisted, of the CDMA network, and the first signal interference is signal interference generated when the terminal works at actual transmit power of the LTE network and actual transmit power of the CDMA network. The actual transmit power of LTE network is power in the first transmit power set, and the first transmit power set includes any transmit power within a range of minimum transmit power $P_{LTE\_Tx\_min}$ to maximum transmit power $P_{LTE\_Tx\_max}$ of a signal of the LTE network (that is, $P_{LTE\_Tx\_max}$, $P_{LTE\_Tx\_max}-1$, ..., and $P_{LTE\_Tx\_min}$). The actual transmit power of the CDMA network is power in the second transmit power set, and the second power set includes any transmit power within a range of minimum transmit power $P_{CDMA\_Tx\_min}$ to maximum transmit power $P_{CDMA\_Tx\_max}$ of a signal of the CDMA network (that is, $P_{CDMA\_Tx\_max}$, $P_{CDMA\_Tx\_max}-1$, ..., and $P_{LTE\_Tx\_min}$), and minimum receive power in combinations of first transmit power and second transmit power separately is $P_{sensitivity\_1x}$, $P_{sensitivity\_2}$, ..., and $P_{sensitivity\_n}$. The actual transmit power of the CDMA network and actual receive power of the CDMA network may be estimated by means of open loop power control.

transmit frequency band and a transmit frequency of a CDMA network of the second candidate cell in the at least one candidate cell is in the second transmit frequency band, a priority of the first candidate cell is higher than a priority of the second candidate cell, where the first candidate cell is any candidate cell in the at least one candidate cell, and the second candidate cell is any candidate cell in the at least one candidate cell except the first candidate cell.

Because the transmit frequency of the CDMA network of the first candidate cell is not in the second transmit frequency band of the CDMA network, an intermodulation product of a transmit signal of the first candidate cell and a transmit signal of the LTE network does not interfere with a received signal of the CDMA network of the first candidate cell, and the transmit frequency of the LTE network of the second candidate cell is in the first transmit frequency band and the transmit frequency of the CDMA network of the second candidate cell is in the second transmit frequency band, an intermodulation product of a transmit signal of the second candidate cell and the transmit signal of the LTE network interferes with the received signal of the CDMA network of the first candidate cell. Therefore, if pilot signal strength of the second candidate cell is higher than that of the first candidate cell, the pilot signal strength of the second candidate cell should be reduced such that a priority of the second candidate cell is lower than that of the first candidate cell, and the first candidate cell is determined as the target cell to be handed over to, to prevent a potential interference risk.

TABLE 1

| | $f_{LTE}$ | | | | |
|---|---|---|---|---|---|
| $f_{1x}$ | $P_{LTE\_Tx\_max}$ | $P_{LTE\_Tx\_max}-1$ | $P_{LTE\_Tx\_max}-2$ | ... | $P_{LTE\_Tx\_min}$ |
| $P_{CDMA\_Tx\_max}$ | $P_{sensitivity\_1}$ | $P_{sensitivity\_2}$ | ... | ... | ... |
| $P_{CDMA\_Tx\_max}-1$ | ... | ... | ... | ... | ... |
| $P_{CDMA\_Tx\_max}-2$ | ... | ... | ... | ... | ... |
| ... | ... | ... | ... | ... | ... |
| $P_{CDMA\_Tx\_min}$ | ... | ... | ... | $P_{sensitivity\_n}-1$ | $P_{sensitivity\_n}$ |

Step S203: Perform priority sorting on the at least one candidate cell according to a determining result and the pilot signal strength of each candidate cell in the at least one candidate cell.

Furthermore, the preset anti-interference capability information table is searched, a searching result is obtained, and further processing is performed, and a process may include the following three cases.

In an implementation manner, priority sorting is performed on the at least one candidate cell according to the pilot signal strength of each candidate cell in the at least one candidate cell if none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band.

In another implementation manner, if a transmit frequency of an LTE network of a first candidate cell in the at least one candidate cell is not in the first transmit frequency band and a transmit frequency of a CDMA network of the first candidate cell in the at least one candidate cell is not in the second transmit frequency band of the CDMA network, and a transmit frequency of an LTE network of a second candidate cell in the at least one candidate cell is in the first In another implementation manner, if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band, actual transmit power of the LTE networks of all the candidate cells, actual transmit power of the CDMA networks of all the candidate cells, and actual receive power of the CDMA networks of all the candidate cells are separately acquired, and priority sorting is performed on the at least one candidate cell according to a difference between the CDMA network actual receive power of each candidate cell and preset receive power of each candidate cell when CDMA network actual receive power of each candidate cell in the at least one candidate cell is less than minimum receive power.

Furthermore, first transmit power of the LTE network and preset receive power (that is, minimum receive power at which signal interference can be resisted) of each candidate cell that corresponds to actual transmit power of each candidate cell in the at least one candidate cell are separately searched for according to the anti-interference capability information table, and priority sorting is performed on the at least one candidate cell in descending order of differences between the actual receive power of the candidate cells and the preset receive power of the candidate cells. For example, it is assumed that the first transmit power of the LTE network in which the terminal is located is $P_{LTE}$. By means of open loop power control, it is estimated that actual transmit power of the first candidate cell is $P_{11}$, and actual receive power of the first candidate cell is $P_{12}$, and actual transmit power of the second candidate cell is $P_{21}$, and actual receive power of the second candidate cell is $P_{22}$. The anti-interference capability information table is searched to acquire that preset receive power corresponding to $P_{LTE}$ and $P_{11}$ is $P_{sensitivity\_11}$, preset receive power corresponding to $P_{LTE}$ and $P_{21}$ is $P_{sensitivity\_21}$, and if it is calculated that a difference between $P_{12}$ and $P_{sensitivity\_11}$ is greater than a difference between $P_{22}$ and $P_{sensinvity\_21}$, it may be determined that the priority of the first candidate cell is higher than that of the second candidate cell.

It should be noted that, a larger difference between actual receive power of a candidate cell and minimum receive power of the candidate cell indicates smaller interference impact on a received signal of a CDMA network of the candidate cell, and therefore, the candidate cell with a larger difference should have a higher priority.

Step S204: Send a sorting result of the at least one candidate cell to a base station.

Furthermore, a message including the sorting result of the at least one candidate cell is sent to the base station such that the base station may select a target cell according to a priority sorting result, that is, a cell to which a terminal expects to hand over.

Step S205: Receive an indication message sent by the base station.

Where the indication message includes at least information about a target cell that is determined by the base station according to the sorting result.

The sorting result carries a priority sorting result of each candidate cell, which may further be a sorting result of the pilot signal strength. After selecting, according to the sorting result, a candidate cell with a highest priority as the target cell, the base station sends, to the terminal, an indication message for performing a handover, where the indication message carries frequency information corresponding to the target cell.

Step S206: Perform a handover to the target cell according to the indication message.

Furthermore, the terminal hands over, according to the indication message, to the target cell corresponding to the frequency information. The terminal may further send a handover completion message to the network system, to notify the network system that a hard handover process is successfully completed.

In this embodiment of the present disclosure, when a cell handover is required, a degree of interference to a received signal of at least one candidate cell is predetermined in advance, priority sorting is performed according to the degree of interference, and after receiving a candidate cell after sorting, a base station can select an optimal candidate cell that totally generates no interference or generates relatively little interference as a target cell to be handed over to, to instruct a terminal to hand over to the target cell such that interference to a received signal can be effectively prevented or reduced after a cell handover, communication quality and user experience are ensured, and additional network overheads and hardware design costs and complexity thereof are not increased.

In order to better implement the foregoing solutions in the embodiments of the present disclosure, related apparatuses configured to implement the foregoing solutions in cooperation are further provided below.

Figure 3:
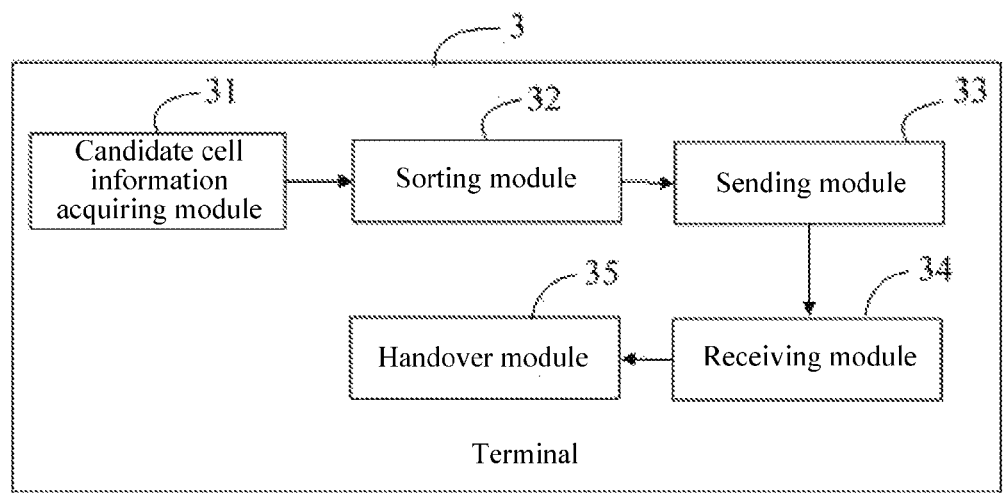
FIG. 3 is a schematic structural diagram of a terminal according to an embodiment of the present disclosure.

Refer to FIG. 3, which shows a terminal 3 provided by an embodiment of the present disclosure, which may include a candidate cell information acquiring module 31, a sorting module 32, a sending module 33, a receiving module 34, and a handover module 35.

The candidate cell information acquiring module 31 is configured to acquire information about at least one candidate cell.

It should be noted that, a base station, that is, a public mobile communications base station, is a form of a radio station, and refers to a radio transceiver station that transmits information to a mobile terminal using a mobile communications switching center in a radio coverage area, and coverage of a radio signal of a base station is a cell. When a terminal is located at an edge of a CDMA1x cell or another neighboring cell of a cell in which a neighboring terminal resides can provide better communications link quality, a network system requires the terminal to perform a cell handover, that is, the terminal first disconnects a signal connection to an original base station and then establishes a connection to a base station of a new cell. If a frequency configuration of the new cell is different from a frequency of an original residing cell, it is an inter-frequency hard handover. Before the handover is performed, the terminal receives a trigger signal of the network system, where the trigger signal is used to instruct the terminal to acquire information about at least one candidate cell, and the information includes a frequency of each candidate cell in the at least one candidate cell, and the terminal searches for pilot signal strength of each candidate cell according to the frequency information.

Figure 4:
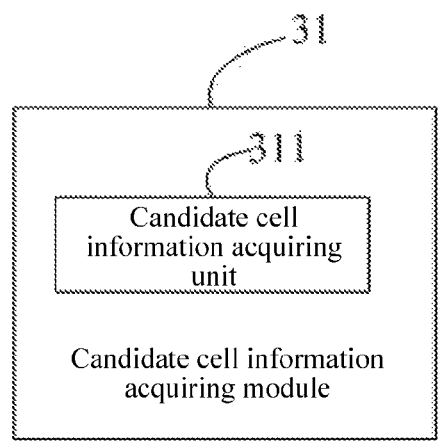
FIG. 4 is a schematic structural diagram of a candidate cell information acquiring module according to an embodiment of the present disclosure.

In an implementation manner, referring to FIG. 4, the candidate cell information acquiring module 31 includes a candidate cell information acquiring unit 311. The candidate cell information acquiring unit 311 is configured to acquire pilot signal strength and frequency information of each candidate cell in the at least one candidate cell, where the frequency information includes a transmit frequency of an LTE network and a transmit frequency of the CDMA network of the at least one candidate cell.

It should be noted that, when a terminal is located at an edge of a CDMA1x cell or another neighboring cell of a cell in which a neighboring terminal resides can provide better communications link quality, a network system requires the terminal to perform a cell handover, that is, the terminal first disconnects a signal connection to an original base station and then establishes a connection to a base station of a new cell. If a frequency configuration of the new cell is different from a frequency of an original residing cell, it is an inter-frequency hard handover. Before the handover is performed, the terminal receives a trigger signal of the network system, where the trigger signal is used to instruct the terminal to acquire information about at least one candidate cell, and the information includes frequency information of each candidate cell in the at least one candidate cell, and the terminal searches for and acquires pilot signal strength of each candidate cell according to the frequency information.

It should be noted that, a pilot signal is a direct sequence spread spectrum signal that is continuously transmit by a base station and that is not modulated, and the pilot signal enables a mobile phone to obtain a forward code division multiple access channel time limit, provide a related demodulation phase reference, and provide a signal strength comparison to each base station such that the terminal can determine a time to perform a handover.

The sorting module 32 is configured to perform priority sorting on the at least one candidate cell according to strength of interference to a received signal of a CDMA network of each candidate cell in the at least one candidate cell.

Because a frequency configuration of a candidate cell may be different from that of a current residing cell, after the cell handover, an intermodulation interference signal generated by two radio frequency transmit signals of an LTE network and the CDMA network may interfere with a received signal of a CDMA network of a cell after the handover. Therefore, before the handover, strength of interference to a received signal of each candidate cell should be predetermined such that the terminal preferentially selects a candidate cell that has no interference risk or a cell with a relatively small interference risk as a target cell to be handed over to.

It should be noted that, when the received signal of the CDMA network of each candidate cell is not interfered, that is, strength of interference is zero, sorting is performed according to the pilot signal strength of each candidate cell, and higher pilot signal strength indicates a higher priority. When an intermodulation product frequency generated by two radio frequency transmit signal of an LTE network and a CDMA network of a candidate cell is within an actual received signal frequency band range of the CDMA network, all received signals of the CDMA network of the candidate cell are interfered. In this case, priority sorting is performed according to a difference between actual receive power of the CDMA network and minimum receive power at which interference can be resisted and that is actually measured, and further, priority sorting may be performed by adjusting the pilot signal strength, for example, a pilot signal of a cell that is strongly interfered is reduced, and degrading processing is performed on a priority thereof.

Figure 5:
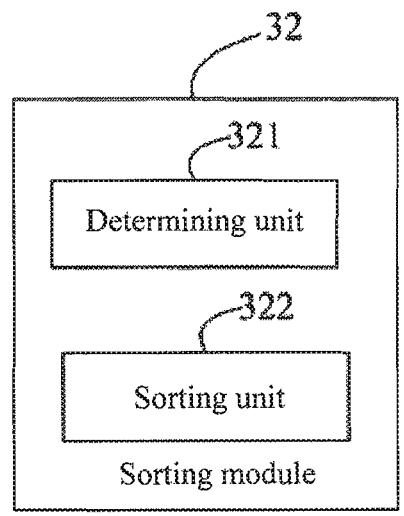
FIG. 5 is a schematic structural diagram of a sorting module according to an embodiment of the present disclosure.

In an implementation manner, referring to FIG. 5, the sorting module 32 includes a determining unit 321 and a sorting unit 322.

The determining unit 321 is configured to determine whether a transmit frequency of an LTE network of each candidate cell in the at least one candidate cell is in a preset first transmit frequency band of the LTE network and whether a transmit frequency of the CDMA network of each candidate cell in the at least one candidate cell is in a preset second transmit frequency band of the CDMA network, where an intermodulation signal generated between a signal in the first transmit frequency band of the LTE network and a signal in the second transmit frequency band of the CDMA network interferes with the received signal of the CDMA network.

Furthermore, referring to Table 1 in the foregoing embodiment, which is an anti-interference capability information table prestored by the terminal, where the table stores a first transmit frequency band $f_{LTE}$ of an LTE network and a second transmit frequency band $f_{1x}$ of a CDMA network that are supported by the terminal, and an intermodulation product of a signal in the first transmit frequency band $f_{LTE}$ of the LTE network and a signal in the second transmit frequency band $f_{1x}$ of the CDMA network interferes with the received signal of the CDMA network. The first transmit frequency band $f_{LTE}$ of the LTE network and the second transmit frequency band $f_{1x}$ of the CDMA network are calculated according to a frequency band capability supported by the terminal and the foregoing intermodulation formula, and when a configuration frequency (that is, a transmit signal frequency) of a candidate cell is within a range of $f_{LTE}$ and $f_{1x}$, a received signal of a CDMA network thereof is interfered with. By searching the anti-interference capability information table, it may be obtained whether the transmit frequency of the LTE network of each candidate cell is in the preset first transmit frequency band $f_{LTE}$ of the LTE network and whether the transmit frequency of the CDMA network of each candidate cell is in the preset second transmit frequency band $f_{1x}$ of the CDMA network.

Further, the anti-interference capability information table further stores a first transmit power set of a signal in the first transmit frequency band $f_{LTE}$ of the LTE network, a second transmit power set in the second transmit frequency band $f_{1x}$ of the CDMA network, and preset receive power, where the preset receive power is minimum receive power, which is preset by the terminal and at which first signal interference can be resisted, of the CDMA network, and the first signal interference is signal interference generated when the terminal works at actual transmit power of the LTE network and actual transmit power of the CDMA network. The actual transmit power of LTE network is power in the first transmit power set, and the first transmit power set includes any transmit power within a range of minimum transmit power $P_{LTE\_Tx\_min}$ to maximum transmit power $P_{LTE\_Tx\_max}$ of a signal of the LTE network (that is, $P_{LTE\_Tx\_max}$, $P_{LTE\_Tx\_max}-1, \ldots,$ and $P_{LTE\_Tx\_min}$), the actual transmit power of the CDMA network is power in the second transmit power set, and the second power set includes any transmit power within a range of minimum transmit power $P_{CDMA\_Tx\_min}$ to maximum transmit power $P_{CDMA\_Tx\_max}$ of a signal of the CDMA network (that is, $P_{CDMA\_Tx\_max}$, $P_{CDMA\_Tx\_max}-1, \ldots,$ and $P_{ETE\_Tx\_min}$), and minimum receive power in combinations of first transmit power and second transmit power separately is $P_{sensitivity\_1x}$, $P_{sensitivity\_2x}, \ldots,$ and $P_{sensitivity\_n}$. The actual transmit power of the CDMA network and actual receive power of the CDMA network may be estimated by means of open loop power control.

The sorting unit 322 is configured to perform priority sorting on the at least one candidate cell according to a determining result and the pilot signal strength of each candidate cell in the at least one candidate cell.

Figure 6:
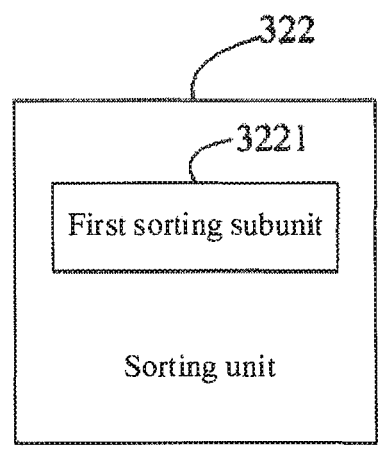
FIG. 6 is a schematic structural diagram of a sorting unit according to an embodiment of the present disclosure.

In a first possible implementation manner, referring to FIG. 6, the sorting unit 322 includes a first sorting subunit 3221.

If none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band, the first sorting subunit 3221 is configured to perform priority sorting on the at least one candidate cell according to the pilot signal strength of each candidate cell in the at least one candidate cell.

Figure 7:
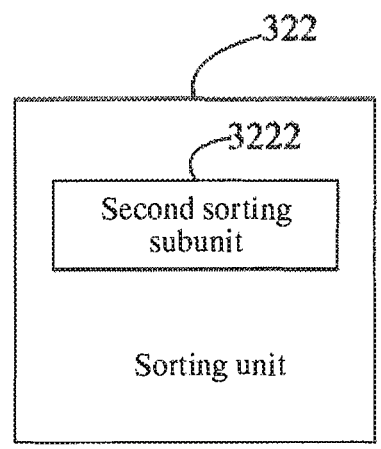
FIG. 7 is a schematic structural diagram of another sorting unit according to an embodiment of the present disclosure.

In a second possible implementation manner, referring to FIG. 7, the sorting unit 322 includes a second sorting subunit 3222.

If a transmit frequency of an LTE network of a first candidate cell in the at least one candidate cell is not in the first transmit frequency band and a transmit frequency of a CDMA network of the first candidate cell in the at least one candidate cell is not in the second transmit frequency band of the CDMA network, and a transmit frequency of an LTE network of a second candidate cell in the at least one candidate cell is in the first transmit frequency band and a transmit frequency of a CDMA network of the second candidate cell in the at least one candidate cell is in the second transmit frequency band, the second sorting subunit 3222 determines that a priority of the first candidate cell is higher than a priority of the second candidate cell, where the first candidate cell is any candidate cell in the at least one candidate cell, and the second candidate cell is any candidate cell in the at least one candidate cell except the first candidate cell.

Because the transmit frequency of the CDMA network of the first candidate cell is not in the second transmit frequency band of the CDMA network, an intermodulation product of a transmit signal of the first candidate cell and a transmit signal of the LTE network does not interfere with a received signal of the CDMA network of the first candidate cell, and the transmit frequency of the LTE network of the second candidate cell is in the first transmit frequency band and the transmit frequency of the CDMA network of the second candidate cell is in the second transmit frequency band, an intermodulation product of a transmit signal of the second candidate cell and the transmit signal of the LTE network interferes with the received signal of the CDMA network of the first candidate cell. Therefore, if pilot signal strength of the second candidate cell is higher than that of the first candidate cell, the pilot signal strength of the second candidate cell should be reduced such that a priority of the second candidate cell is lower than that of the first candidate cell, and the first candidate cell is determined as the target cell to be handed over to, to prevent a potential interference risk.

Figure 8:
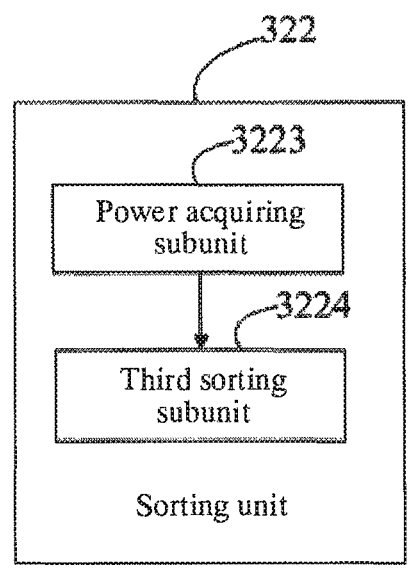
FIG. 8 is a schematic structural diagram of still another sorting unit according to an embodiment of the present disclosure.

In a third possible implementation manner, referring to FIG. 8, the sorting unit 322 includes a power acquiring subunit 3223 and a third sorting subunit 3224.

The power acquiring subunit 3223 is configured to separately acquire actual transmit power of the LTE networks of all the candidate cells, actual transmit power of the CDMA networks of all the candidate cells, and actual receive power of the CDMA networks of all the candidate cells if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band, and the third sorting subunit 3224 performs priority sorting on the at least one candidate cell according to a difference between the actual receive power of the CDMA network of each candidate cell and preset receive power of each candidate cell when the actual receive power of the CDMA network of each candidate cell in the at least one candidate cell is less than minimum receive power.

Furthermore, first transmit power of the LTE network and preset receive power (that is, minimum receive power at which signal interference can be resisted) of each candidate cell that corresponds to actual transmit power of each candidate cell in the at least one candidate cell are separately searched for according to the anti-interference capability information table, and priority sorting is performed on the at least one candidate cell in descending order of differences between the actual receive power of the candidate cells and the preset receive power of the candidate cells. For example, it is assumed that the first transmit power of the LTE network in which the terminal is located is $P_{LTE}$. By means of open loop power control, it is estimated that actual transmit power of the first candidate cell is $P_{11}$, and actual receive power of the first candidate cell is $P_{12}$, and actual transmit power of the second candidate cell is $P_{21}$, and actual receive power of the second candidate cell is $P_{22}$. The anti-interference capability information table is searched to acquire that preset receive power corresponding to $P_{LTE}$ and $P_{11}$ is $P_{sensitivity\_11}$, preset receive power corresponding to $P_{LTE}$ and $P_{21}$ is $P_{sensitivity\_21}$, and if it is calculated that a difference between $P_{12}$ and P greater than a difference between $P_{22}$ and $P_{sensitivity\_11}$ is $P_{sensitivity\_21}$, it may be determined that the priority of the first candidate cell is higher than that of the second candidate cell.

It should be noted that, a larger difference between actual receive power of a candidate cell and minimum receive power of the candidate cell indicates smaller interference impact on a received signal of a CDMA network of the candidate cell, and therefore, the candidate cell with a larger difference should have a higher priority.

The sending module 33 is configured to send a sorting result of the at least one candidate cell to a base station.

Further, the sending module 33 sends a message including the sorting result of the at least one candidate cell to the base station such that the base station may select a target cell according to a priority sorting result, that is, a cell to which a terminal expects to hand over.

The receiving module 34 is configured to receive an indication message sent by the base station, where the indication message includes at least information about a target cell that is determined by the base station according to the sorting result.

The sorting result carries a priority sorting result of each candidate cell, which may further be a sorting result of the pilot signal strength. After selecting, according to the sorting result, a candidate cell with a highest priority as the target cell, the base station sends, to the terminal, an indication message for performing a handover, where the indication message carries frequency information corresponding to the target cell.

Figure 9:
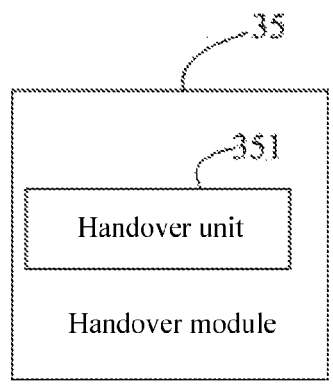
FIG. 9 is a schematic structural diagram of a handover module according to an embodiment of the present disclosure.

The handover module 35 is configured to perform a handover to the target cell according to the indication message. Referring to FIG. 9, the handover module 35 includes a handover unit 351.

The handover unit 351 is configured to perform, according to the indication message, a handover to the target cell corresponding to the frequency information. Further, the handover unit 351 performs, according to the indication message, a handover to the target cell corresponding to the frequency information. The terminal 3 may further send a handover completion message to the network system, to notify the network system that a hard handover process is successfully completed.

In this embodiment of the present disclosure, when a cell handover is required, a degree of interference to a received signal of at least one candidate cell is predetermined in advance. Priority sorting is performed according to the degree of interference, and after receiving a candidate cell after sorting, a base station can select an optimal candidate cell that totally generates no interference or generates relatively little interference as a target cell to be handed over to, to instruct a terminal to hand over to the target cell such that interference to a received signal can be effectively prevented or reduced after a cell handover, communication quality and user experience are ensured, and additional network overheads and hardware design costs and complexity thereof are not increased.

An embodiment of the present disclosure provides a computer storage medium, where the computer storage medium stores a first program, and the first program performs the steps in the cell handover method shown in FIG. 1 or FIG. 2.

Figure 10:
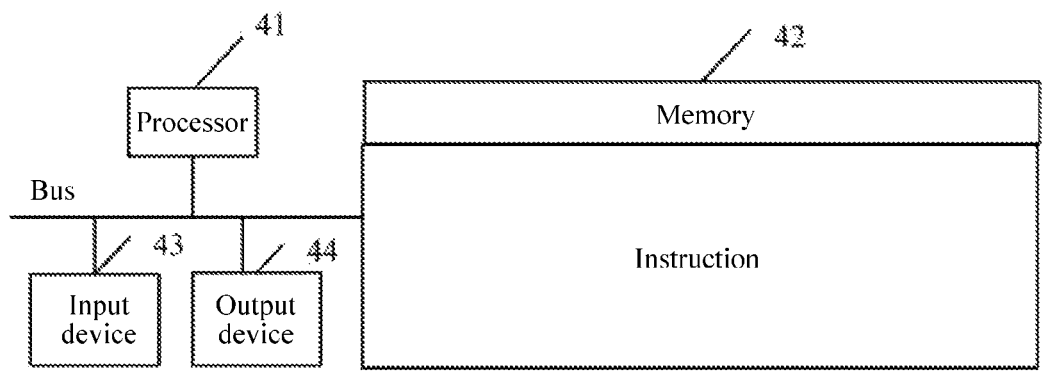
FIG. 10 is a schematic structural diagram of another terminal according to an embodiment of the present disclosure.

Referring to FIG. 10, an embodiment of the present disclosure further provides a terminal, including a processor 41 (a quantity of the processors 41 may be one or more, and in FIG. 10, one is used as an example), a memory 42, an input device 43, and an output device 44. The processor 41, the memory 42, the input device 43, and the output device 44 may be connected using a bus or in another manner, where in FIG. 10, a connection using a bus is used as an example. The memory 42 stores an application program executed by the processor 41.

The processor 41 performs the following steps: acquiring information about at least one candidate cell, performing priority sorting on the at least one candidate cell according to strength of interference to a received signal of a CDMA network of each candidate cell in the at least one candidate cell sending a sorting result of the at least one candidate cell to a base station, receiving an indication message sent by the base station, where the indication message includes at least information about a target cell that is determined by the base station according to the sorting result, and performing a handover to the target cell according to the indication message.

In some implementation manners of the present disclosure, acquiring, by the processor, information about at least one candidate cell includes acquiring pilot signal strength and frequency information of each candidate cell in the at least one candidate cell, where the frequency information includes a transmit frequency of an LTE network and a transmit frequency of the CDMA network of the at least one candidate cell, and performing, by the processor, priority sorting on the at least one candidate cell according to strength of interference to a received signal of a CDMA network of each candidate cell in the at least one candidate cell includes determining whether the transmit frequency of the LTE network of each candidate cell in the at least one candidate cell is in a preset first transmit frequency band of the LTE network and whether the transmit frequency of the CDMA network of each candidate cell in the at least one candidate cell is in a preset second transmit frequency band of the CDMA network, where an intermodulation signal generated between a signal in the first transmit frequency band of the LTE network and a signal in the second transmit frequency band of the CDMA network interferes with the received signal of the CDMA network, and performing priority sorting on the at least one candidate cell according to a determining result and the pilot signal strength of each candidate cell in the at least one candidate cell.

In some implementation manners of the present disclosure, performing, by the processor, priority sorting on the at least one candidate cell according to a determining result and the pilot signal strength of each candidate cell in the at least one candidate cell includes performing priority sorting on the at least one candidate cell according to the pilot signal strength of each candidate cell in the at least one candidate cell if none of the transmit frequencies of the LTE networks of all the candidate cells in the at least one candidate cell is in the first transmit frequency band or none of the transmit frequencies of the CDMA networks of all the candidate cells in the at least one candidate cell is in the second transmit frequency band.

In some implementation manners of the present disclosure, performing, by the processor, priority sorting on the at least one candidate cell according to a determining result and the pilot signal strength of each candidate cell in the at least one candidate cell includes, if a transmit frequency of an LTE network of a first candidate cell in the at least one candidate cell is not in the first transmit frequency band and a transmit frequency of a CDMA network of the first candidate cell in the at least one candidate cell is not in the second transmit frequency band of the CDMA network, and a transmit frequency of an LTE network of a second candidate cell in the at least one candidate cell is in the first transmit frequency band and a transmit frequency of a CDMA network of the second candidate cell in the at least one candidate cell is in the second transmit frequency band, a priority of the first candidate cell being higher than a priority of the second candidate cell, where the first candidate cell is any candidate cell in the at least one candidate cell, and the second candidate cell is any candidate cell in the at least one candidate cell except the first candidate cell.

In some implementation manners of the present disclosure, performing, by the processor, priority sorting on the at least one candidate cell according to a determining result and the pilot signal strength of each candidate cell in the at least one candidate cell includes separately acquiring actual transmit power of the LTE networks of all the candidate cells, actual transmit power of the CDMA networks of all the candidate cells, and actual receive power of the CDMA networks of all the candidate cells if the transmit frequencies of the LTE networks of all the candidate cells in the at least one candidate cell are all in the first transmit frequency band, and the transmit frequencies of the CDMA networks of all the candidate cells in the at least one candidate cell are all in the second transmit frequency band, and performing priority sorting on the at least one candidate cell according to a difference between the actual receive power of the CDMA network of each candidate cell and preset receive power of each candidate cell when the actual receive power of the CDMA network of each candidate cell in the at least one candidate cell is less than minimum receive power, where the preset receive power is minimum receive power, which is preset by a terminal and at which first signal interference can be resisted, of the CDMA network, and the first signal interference is signal interference generated when the terminal works at the actual transmit power of the LTE network and the actual transmit power of the CDMA network.

In some implementation manners of the present disclosure, the indication message carries frequency information of the target cell, and performing, by the processor, a handover to the target cell according to the indication message includes performing, according to the indication message, a handover to the target cell corresponding to the frequency information.

In this embodiment of the present disclosure, when a cell handover is required, a degree of interference to a received signal of at least one candidate cell is predetermined in advance, priority sorting is performed according to the degree of interference, and after receiving a candidate cell after sorting, a base station can select an optimal candidate cell that totally generates no interference or generates relatively little interference as a target cell to be handed over to, to instruct a terminal to hand over to the target cell such that interference to a received signal can be effectively prevented or reduced after a cell handover, communication quality and user experience are ensured, and additional network overheads and hardware design costs and complexity thereof are not increased.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation. The computer-readable medium may include a random-access memory (RAM), a read-only memory (ROM), electrically erasable programmable read-only memory (EEPROM), a compact disc read-only memory (CD-ROM), or another optical disc storage or disk storage medium, or another magnetic storage device, or any other medium that can be used to carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, the optical fiber/cable, the twisted pair, the DSL or the wireless technologies such as infrared ray, radio and microwave are included in definition of a medium to which they belong. For example, a disk and disc used by the present disclosure includes a compact disc (CD), a laser disc, an optical disc, a digital versatile disc (DVD), a floppy disk and a BLU-RAY DISC, where the disk generally copies data magnetically, and the disc copies data optically using lasers. The foregoing combination should also be included in the protection scope of the computer-readable medium.

What is disclosed above is merely exemplary embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. A cell handover method, comprising:
   acquiring pilot signal strength and frequency information of each candidate cell in one or more candidate cells, wherein the frequency information comprises a transmit frequency of a Long Term Evolution (LTE) network and a transmit frequency of a code division multiple access (CDMA) network of the one or more candidate cell;
   performing priority sorting on the one or more candidate cells according to strength of interference to a received signal of the CDMA network of each candidate cell in the one or more candidate cells by:
     determining whether the transmit frequency of the LTE network of each candidate cell in the one or more candidate cells is in a preset first transmit frequency band of the LTE network and whether the transmit frequency of the CDMA network of each candidate cell in the one or more candidate cells is in a preset second transmit frequency band of the CDMA network, wherein an intermodulation signal generated between a signal in the first transmit frequency band of the LTE network and another signal in the second transmit frequency band of the CDMA network interferes with the received signal of the CDMA network; and
     performing the priority sorting on the one or more candidate cells according to a determining result and the pilot signal strength of each candidate cell in the one or more candidate cells;
   sending a sorting result of the one or more candidate cells to a base station;
   receiving an indication message sent by the base station, wherein the indication message comprises at least information about a target cell that is determined by the base station according to the sorting result; and
   performing a handover to the target cell according to the indication message.

2. The cell handover method according to claim 1, wherein performing the priority sorting on the one or more candidate cells according to the determining result and the pilot signal strength of each candidate cell in the one or more candidate cells comprises performing the priority sorting on the one or more candidate cells according to the pilot signal strength of each candidate cell in the one or more candidate cells when none of the transmit frequencies of the LTE networks of all the candidate cells in the one or more candidate cell is in the first transmit frequency band or none of the transmit frequencies of the CDMA networks of all the candidate cells in the one or more candidate cells is in the second transmit frequency band.

3. The cell handover method according to claim 1, wherein performing the priority sorting on the one or more candidate cells according to the determining result and the pilot signal strength of each candidate cell in the one or more candidate cells comprises determining that a priority of a first candidate cell is higher than a priority of a second candidate cell when the transmit frequency of the LTE network of the first candidate cell in the one or more candidate cells is not in the first transmit frequency band and the transmit frequency of the CDMA network of the first candidate cell in the one or more candidate cells is not in the second transmit frequency band of the CDMA network, and the transmit frequency of the LTE network of the second candidate cell in the one or more candidate cells is in the first transmit frequency band and the transmit frequency of the CDMA network of the second candidate cell in the one or more candidate cells is in the second transmit frequency band, wherein the first candidate cell is any candidate cell in the one or more candidate cells, and wherein the second candidate cell is any candidate cell in the one or more candidate cells except the first candidate cell.

4. The cell handover method according to claim 1, wherein performing the priority sorting on the one or more candidate cells according to the determining result and the pilot signal strength of each candidate cell in the one or more candidate cells comprises:
   separately acquiring actual transmit power of the LTE networks of all the candidate cells, actual transmit power of the CDMA networks of all the candidate cells, and actual receive power of the CDMA networks of all the candidate cells when the transmit frequencies of the LTE networks of all the candidate cells in the one or more candidate cells are all in the first transmit frequency band, and the transmit frequencies of the CDMA networks of all the candidate cells in the one or more candidate cells are all in the second transmit frequency band; and
   performing the priority sorting on the one or more candidate cells according to a difference between the actual receive power of the CDMA network of each candidate cell and a preset receive power of each candidate cell when the actual receive power of the CDMA network of each candidate cell in the one or more candidate cells is less than the preset receive power, wherein the preset receive power is minimum receive power, which is preset by a terminal and at which a first signal interference can be resisted, of the CDMA network, and wherein the first signal interference is a signal interference generated when the terminal operates at the actual transmit power of the LTE network and the actual transmit power of the CDMA network.

5. The cell handover method according to claim 1, wherein the indication message carries frequency information of the target cell, and wherein performing the handover to the target cell according to the indication message comprises performing, according to the indication message, the handover to the target cell corresponding to the frequency information.

6. A non-transitory computer storage medium comprising computer executable instructions such that when executed by a processor cause a terminal to
    acquire pilot signal strength and frequency information of each candidate cell in one or more candidate cells, wherein the frequency information comprises a transmit frequency of a long term evolution (LTE) network and a transmit frequency of a code division multiple access (CDMA) network of the one or more candidate cell;
    perform priority sorting on the one or more candidate cells according to strength of interference to a received signal of the CDMA network of each candidate cell in the one or more candidate cells by:
        determining whether the transmit frequency of the LTE network of each candidate cell in the one or more candidate cells is in a preset first transmit frequency band of the LTE network and whether the transmit frequency of the CDMA network of each candidate cell in the one or more candidate cells is in a preset second transmit frequency band of the CDMA network, wherein an intermodulation signal generated between a signal in the first transmit frequency band of the LTE network and another signal in the second transmit frequency band of the CDMA network interferes with the received signal of the CDMA network; and
        performing the priority sorting on the one or more candidate cells according to a determining result and the pilot signal strength of each candidate cell in the one or more candidate cells;
    send a sorting result of the one or more candidate cells to a base station;
    receive an indication message sent by the base station, wherein the indication message comprises at least information about a target cell that is determined by the base station according to the sorting result; and
    perform a handover to the target cell according to the indication message.

7. A terminal, comprising:
    a processor;
    a memory;
    an input device; and
    an output device,
    wherein the processor, the memory, the input device and the output device are coupled to each other using a bus,
    wherein the processor is configured to perform the following operations:
        acquire pilot signal strength and frequency information of each candidate cell in one or more candidate cells, wherein the frequency information comprises a transmit frequency of a long term evolution (LTE) network and a transmit frequency of a code division multiple access (CDMA) network of the one or more candidate cells;
        perform priority sorting on the one or more candidate cells according to strength of interference to a received signal of the CDMA network of each candidate cell in the one or more candidate cells:
            determining whether the transmit frequency of the LTE network of each candidate cell in the one or more candidate cells is in a preset first transmit frequency band of the LTE network and whether the transmit frequency of the CDMA network of each candidate cell in the one or more candidate cells is in a preset second transmit frequency band of the CDMA network, wherein an intermodulation signal generated between a signal in the first transmit frequency band of the LTE network and another signal in the second transmit frequency band of the CDMA network interferes with the received signal of the CDMA network; and
            performing the priority sorting on the one or more candidate cells according to a determining result and the pilot signal strength of each candidate cell in the one or more candidate cells;
        send a sorting result of the one or more candidate cells to a base station;
        receive an indication message indicating that the base station determines, according to the sorting result, a target cell to be handed over to; and
        perform a handover to the target cell according to the indication message.

8. The terminal according to claim 7, wherein the processor is further configured to perform the priority sorting on the one or more candidate cells according to the pilot signal strength of each candidate cell in the one or more candidate cells when none of the transmit frequencies of the LTE networks of all the candidate cells in the one or more candidate cells is in the first transmit frequency band or none of the transmit frequencies of the CDMA networks of all the candidate cells in the one or more candidate cells is in the second transmit frequency band.

9. The terminal according to claim 7, wherein the processor is further configured to determine that a priority of a first candidate cell is higher than a priority of a second candidate cell when the transmit frequency of the LTE network of the first candidate cell in the one or more candidate cell is not in the first transmit frequency band and the transmit frequency of the CDMA network of the first candidate cell in the one or more candidate cells is not in the second transmit frequency band of the CDMA network, and the transmit frequency of the LTE network of the second candidate cell in the one or more candidate cells is in the first transmit frequency band and the transmit frequency of the CDMA network of the second candidate cell in the one or more candidate cells is in the second transmit frequency band, wherein the first candidate cell is any candidate cell in the one or more candidate cells, and wherein the second candidate cell is any candidate cell in one or more candidate cells except the first candidate cell.

10. The terminal according to claim 7, wherein the processor is further configured to:
    separately acquire actual transmit power of the LTE networks of all the candidate cells, actual transmit power of the CDMA networks of all the candidate cells, and actual receive power of the CDMA networks of all the candidate cells when the transmit frequencies of the LTE networks of all the candidate cells in the one or more candidate cells are all in the first transmit frequency band, and the transmit frequencies of the CDMA networks of all the candidate cells in the one or more candidate cells are all in the second transmit frequency band; and perform the priority sorting on the one or more candidate cells according to a difference between the actual receive power of the CDMA network of each candidate cell and a preset receive power of each candidate cell when the actual receive power of the CDMA network of each candidate cell in the one or more candidate cells is less than a minimum receive power, wherein the preset receive power is the minimum receive power, which is preset by the terminal and at which a first signal interference can be resisted, of the CDMA network, and wherein the first signal interference is a signal interference generated when the terminal operates at the actual transmit power of the LTE network and the actual transmit power of the CDMA network.

11. The terminal according to claim 7, wherein the indication message carries frequency information of the target cell, and wherein the processor is further configured to perform, according to the indication message, the handover to the target cell corresponding to the frequency information.

* * * * *

UNITED STATES PATENT AND TRADEMARK OFFICE
CERTIFICATE OF CORRECTION

PATENT NO. : 9,955,397 B2
APPLICATION NO. : 15/110558
DATED : April 24, 2018
INVENTOR(S) : Xin Liu, Shui Liu and Zhenfeng Fan It is certified that error appears in the above-identified patent and that said Letters Patent is hereby corrected as shown below:

In the Claims

Column 22; Line 14; Claim 2 should read:
candidate cells is in the first transmit frequency band or none Signed and Sealed this
Fifth Day of June, 2018

Andrei Iancu
*Director of the United States Patent and Trademark Office*